Nov. 3, 1970  B. J. HICKS  3,537,244
LAWN EDGING AND TRIMMING DEVICE
Filed Nov. 21, 1968  3 Sheets-Sheet 1
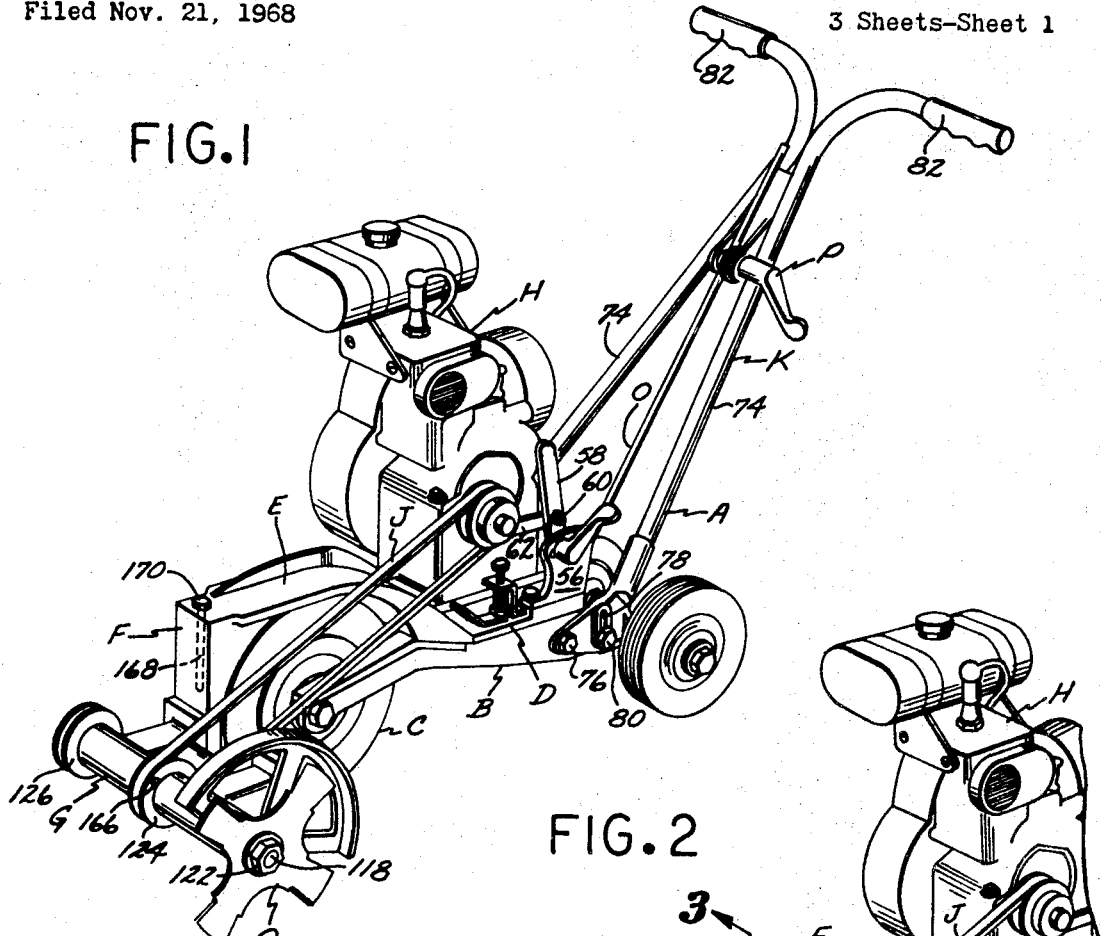
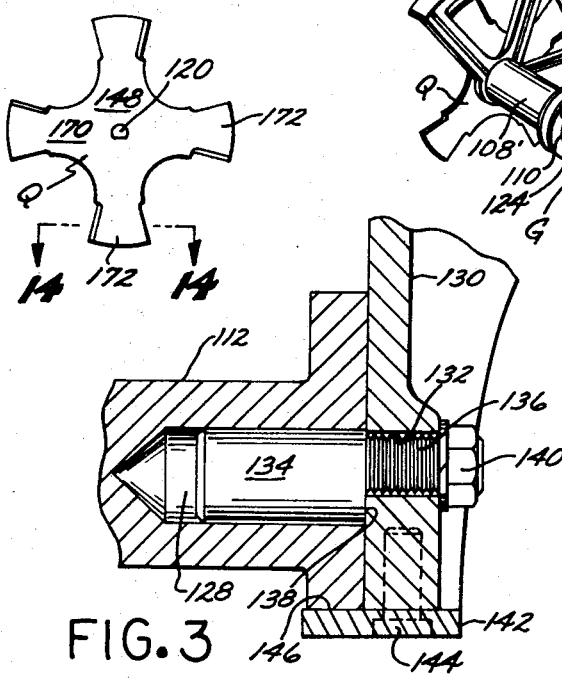
INVENTOR.
BOB J. HICKS
BY
William G. Babcock
ATTORNEY Nov. 3, 1970  B. J. HICKS  3,537,244
LAWN EDGING AND TRIMMING DEVICE
Filed Nov. 21, 1968  3 Sheets-Sheet 2
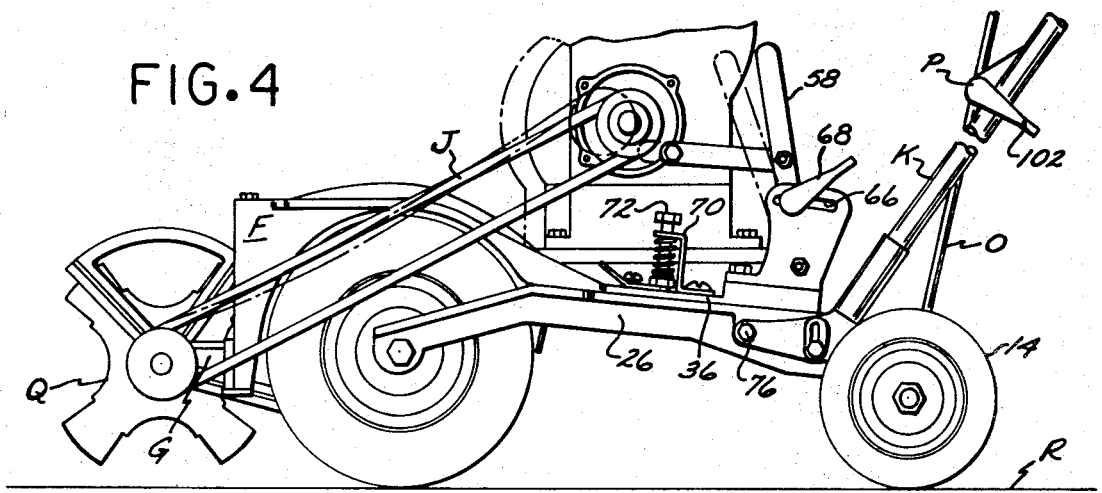
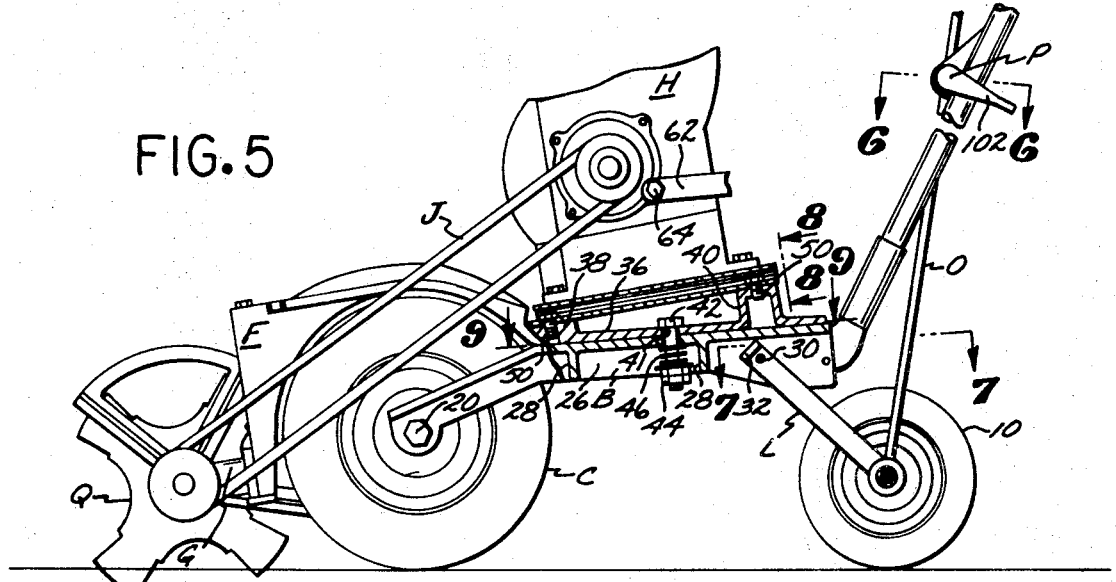
INVENTOR.
BOB J. HICKS
BY
William G. Babcock
ATTORNEY Nov. 3, 1970   B. J. HICKS   3,537,244
LAWN EDGING AND TRIMMING DEVICE
Filed Nov. 21, 1968   3 Sheets-Sheet 3
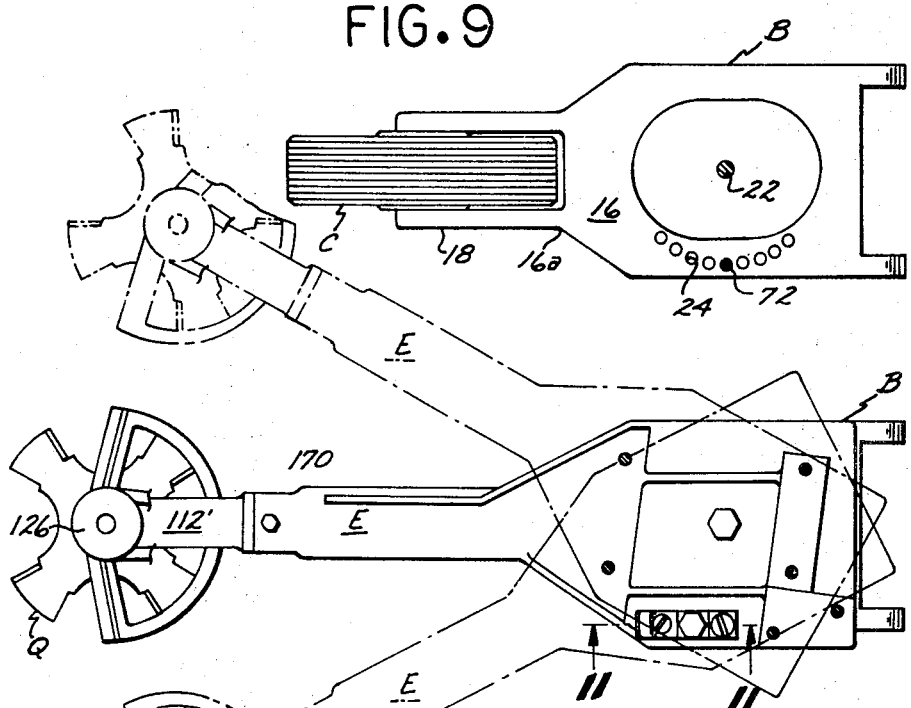
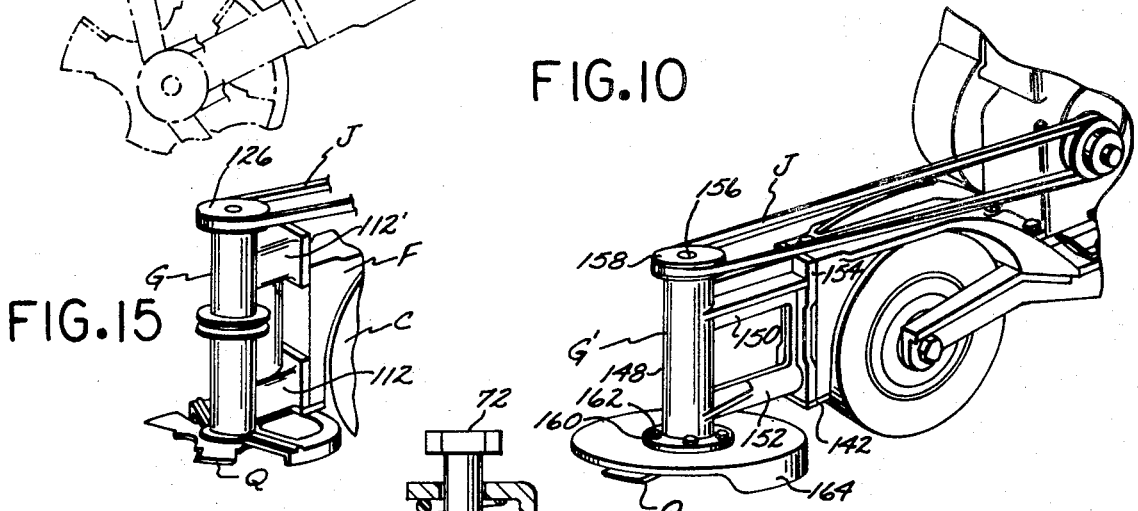
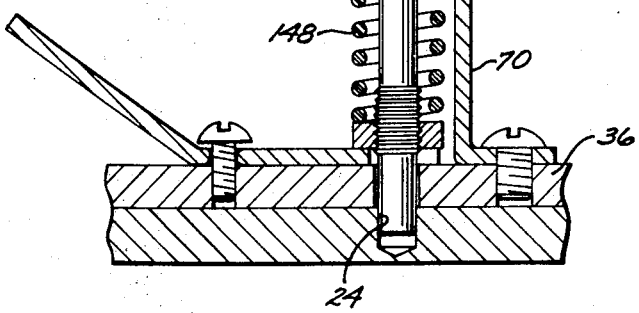
INVENTOR.
BOB J. HICKS
BY
William G. Babcock
ATTORNEY

United States Patent Office 3,537,244
Patented Nov. 3, 1970

3,537,244
LAWN EDGING AND TRIMMING DEVICE
Bob J. Hicks, 11626 Vieta, Lynwood, Calif. 90262
Filed Nov. 21, 1968, Ser. No. 777,588
Int. Cl. A01d 35/00
U.S. Cl. 56—25.4
7 Claims

ABSTRACT OF THE DISCLOSURE

A power-driven lawn edging and trimming device that may be selectively adjusted to cut and trim a lawn to a uniform height on either the left- or right-hand side of the device, as well as edge a lawn to a uniform depth, both when the device is traveling along a curb, as well as moving over a lawn surface.

BACKGROUND OF THE INVENTION

Field of the invention

A combined lawn edging and trimming device that is capable of trimming a lawn along a walk, curb, wall, flower bed, or the like, to a desired uniform height without the necessity of specialized skill in the use of the device, as well as edging a lawn to a desired uniform depth, irrespective of whether the device is moved along a curb or over a lawn surface during the edging operation.

Description of the prior art

Although various types of power-driven units have been devised and used in the past for use in trimming and edging lawns, no one of these units has been of such design and structure as to permit the automatic trimming of a lawn to a desired height on either side of the unit without specialized skill on the part of the user, or to permit edging of a lawn to a uniform depth, irrespective of whether the unit is caused to travel along a curb or over the surface of a lawn. The present invention is adapted for use in uniformly trimming and edging a lawn by a person having little or no skill in such work.

SUMMARY OF THE INVENTION

A power-driven lawn edging and trimming device that may be used by a person having little or no skill in the care of a lawn to selectively cut and trim a lawn to a uniform height on either side of the device as it is passed over the lawn, as well as to permit the edging of a lawn to a uniform depth, irrespective of whether the device is caused to travel longitudinally along a curb or over the lawn surface.

A major object of the present invention is to provide a power-driven lawn edging and trimming device that is of a relatively simple mechanical structure, easy to use, and permits a person having little or no skill in the use of such equipment to trim a lawn to a desired uniform height, as well as edge the lawn to a uniform depth.

Another major object of the invention is to supply a power-driven lawn trimming and edging device that incorporates a rotatable cutter formed from a flat plate of steel, or other hard material, which has first and second cutting edges so disposed thereon that the second cutting edges may be used for lawn trimming after the first edges have become dulled through use by simply reversing the position of the cutter on the device.

Another object of the invention is to provide a power-driven lawn trimming and edging, which due to the structural simplicity thereof, has low maintenance cost, and due to its unique design, may be used for cutting purposes for twice the length of time of devices of this nature available heretofore.

BRIEF DESCRIPTION OF THE DRAWING

FIG. 1 is a perspective view of the power-driven lawn edging and trimming device, with the cutter blades disposed on the left-hand side thereof;

FIG. 2 is a second perspective view of the invention, but with the cutter blade disposed on the right-hand side of the device;

FIG. 3 is a fragmentary, vertical cross-sectional view of a portion of the device, taken on the line 3—3 of FIG. 2;

FIG. 4 is an enlarged side elevational view showing the carriage in a position as to raise the cutter blade to a sufficiently elevated height that the device may be rolled over a hard surface without the cutter blade coming into contact therewith;

FIG. 5 is the same side elevational view with portions broken away and shown in section of the device as that of FIG. 4, but with the carriage adjusted to a position where the cutter blade may edge a lawn surface to a desired uniform depth;

FIG. 6 is an enlarged fragmentary, transverse, cross-sectional view of the device shown in FIG. 5, taken on the line 6—6 thereof;

FIG. 7 is a second fragmentary, transverse, cross-sectional view of the device, taken on the line 7—7 of FIG. 5;

FIG. 8 is a fragmentary and elevational view of the device, taken on the line 8—8 of FIG. 5;

FIG. 9 is a top plan view of the carriage and forwardly disposed carrier wheel;

FIG. 10 is a top plan view of the platform arm and head with the cutter assembly mounted thereon, and illustrating three of the positions the cutter head may occupy;

FIG. 11 is an enlarged fragmentary, vertical cross-sectional view of the device, taken on the line 11—11 of FIG. 10;

FIG. 12 is a perspective view of the forward portion of the device, with an alternate form of cutter assembly mounted thereon in a lawn-trimming position;

FIG. 13 is a top plan view of one of the cutter blades;

FIG. 14 is an enlarged transverse cross-sectional view of one of the cutter blades, taken on the line 14—14 of FIG. 14; and FIG. 15 is a perspective view of the forward portion of the device with the first form of cutter assembly mounted thereon in a lawn-trimming position.

DESCRIPTION OF THE PREFERRED EMBODIMENT

The lawn edging and trimming device A, as may best be seen in FIG. 1, includes an elongate carriage B that is partially supported on a forwardly disposed carrier wheel C. The carriage B pivotally supports a platform D from which an arm E extends upwardly and forwardly over the carrier wheel C to terminate in a head F.

A cutter wheel assembly G is removably positioned on the head F, as illustrated in FIGS. 1, 2, 4 and 5. The platform D removably supports a power unit H, preferably an internal combustion engine, that drives an endless belt J which extends forwardly from the engine to the cutting unit G. A handle K projects upwardly and rearwardly from carriage B that is used in pushing and guiding the lawn trimming and edging device A.

Two laterally spaced legs L, as may best be seen in FIGS. 5 and 7, are pivotally supported from the rear of the carriage B, and these legs serve to support a transverse shaft M. First, second and third wheels 10, 12 and 14, respectively, are mounted on shaft F, with the wheels 12 and 14 being so spaced that they and the wheel C may be rolled along the upper surface of a curb (not shown). A rod O is provided (FIGS. 1, 4 and 5) that is pivotally connected to transverse shaft M, and extends upwardly therefrom to engage a manually operable clamp P mounted on the handle K.

Cutter assembly G, as shown in FIGS. 1 and 2, includes a cross-shaped, rotatable cutting member Q which is disposed on the left-hand side of the device A when the cutter assembly is in the position shown in FIG. 1, and on the right-hand side of the device when the cutter assembly is positioned as illustrated in FIG. 2.

As may best be seen in FIG. 9, the carriage B also includes a rectangular platform portion 16, the first end 16a of which develops into two laterally spaced, parallel arms 18. The forward ends of arms 18 support a bolt or transverse shaft 20 that rotatably supports the carrier wheel C in the manner shown in FIGS. 4 and 5. A centrally disposed opening 22 is formed in platform portion 16 (FIG. 9), and a number of arcuately spaced second openings 24 are also formed therein.

Two laterally spaced side walls 26 depend from platform portion 16 (FIGS. 4 and 5), which are connected by transverse ribs 28. The two legs L are pivotally supported from the side walls 26 by pins 30 (FIG. 5), and the upper extremities of these legs are connected by a cross piece 32 shown in FIG. 7. The rod O, as best shown in FIGS. 5 and 7, is pivotally connected to the transverse shaft M by a collar 34 that is rotatably engaged by the shaft.

Platform D (FIG. 5) includes a flat plate 36 having a raised forward portion 38 and a rear portion 40 of greater elevation than the forward portion. A bore 41 is formed in plate 36 that is in alignment with the opening 22 in carriage B, and a bolt 42 projects downwardly therethrough to be engaged by lock nuts 44. A helical spring 46 circles the bolt 42 and disposed between the under surface of the carriage portion 16 and the uppermost one of the nuts 44. An inverted, longitudinally extending channel-shaped guide 48 is secured to the upper surfaces of the portions 38 and 40 by bolts 50, as may best be seen in FIGS. 5 and 8.

The power unit H includes a base portion 52 provided with a second longitudinally extending channel-shaped guide 54 projecting downwardly therefrom and secured thereto by bolt 55. The guides 48 and 54, as shown in FIG. 8, have slides 48a and 54a, respectively, which project towards one another, and these slides serve to removably support the power unit H on the carriage B when they are in engagement.

A flat, rigid member 56 projects upwardly from the platform plate 36 (FIGS. 1 and 4) which pivotally supports an upwardly extending lever 58 that is connected by means of a pin 60 to a forwardly extending length 62. A pin or bolt 64 (FIG. 5) connects length 62 to the power unit H. Pivotal movement of the lever 58 shifts the power unit H forwardly and rearwardly on the platform D to permit the belt J to be tensioned or loosened to the extent that the cutter assembly G may be moved from the head F and arranged in either of the two positions shown in FIGS. 1 and 2.

A stud bolt (not shown) projects outwardly from the lever 58 through an arcuate slot 66 formed in member 56, and is engaged by a tapped recess formed in a handle 68. Rotation of the handle 68 in an appropriate direction will cause the lever 58 to be held in frictional, binding contact with the member 56 to maintain the power unit H at a predetermined longitudinal position on the carriage B.

An upwardly extending bracket 70 is supported by plate 36 (FIGS. 1 and 4), and a spring-loaded pin 72 associated therewith extends downwardly through a board (not shown) in this plate, with this pin being capable of engaging any one of the openings 24 formed in the carriage B to maintain the platform D, arm E, and head F in desired relationship to the carriage. Two of the positions the platform D may assume are shown in phantom line in FIG. 10.

The handle A includes two laterally spaced, upwardly and rearwardly extending members 74, the lower ends of which are pivotally connected to opposite sides of the rear of carriage B by bolts or pins 76, as also shown in FIGS. 1 and 4. Vertically extending arcuate slots 78 are formed in the forward portions of members 74 through which bolts 80 project to engage tapped recesses (not shown) formed in the carriage side walls 26. By tightening the bolts 80, the handle K can be maintained at a desired upwardly and rearwardly extending angle with the carriage B.

The upwardly and rearwardly extending portions of the members 74 curve outwardly away from one another, as shown in FIG. 1, and grips 82 are mounted thereon. Clamp P (FIG. 6) includes a rigid body 82 that is positioned between the two members 74. A longitudinal bore 84 is formed in body 82 and is collectively aligned with transverse openings 86 formed in the members 74. A bolt 88 projects through the openings 86 and bore 84, and a nut 90 is threaded thereon.

Two flanges 92 in which transversely aligned bores 94 are formed extend forwardly from the body 82, as illustrated in FIG. 6. A cylindrical member 96 is movably supported in the bores 94, and a transverse bore 98 is provided in this member which is adapted to slidably engage the rod O.

A threaded extension 97 projects outwardly from member 96 that is threadedly engaged by a tapped recess 100 formed in a handle 102. A first washer 104 is mounted on the member 96, situated between the rod O and the flange 92 to the right thereof (FIG. 6). A second washer 106 encircles the extension 97, and is situated between the inner end of handle P and the outer surface of that flange 92 most adjacent the washer 104.

When handle P is rotated in the appropriate direction, the member 96 is drawn towards the handle to bring the rod O into frictional binding contact with the washer 104 to support the legs L in a downwardly and rearwardly extending position whereby these legs control the depth to which the cutter Q will edge a lawn, as illustrated in FIG. 5. When the legs L are allowed to occupy a position substantially parallel to the plate 36, the carriage B is pivoted on the wheel C to the position shown in FIG. 4 where the cutter Q is elevated above the surface R on which the device A rests. The edging and trimming device A may then be rolled across the surface R without damage to the cutter Q.

The first form of cutter assembly G, as may best be seen in FIGS. 1, 2 and 3, includes two aligned cylindrical bearings 108 and 108' that are separated by a space 110. Two rectangular sections 112 and 112' extend rearwardly from bearings 108 and 108', respectively, and these sections are connected by a transverse body 114.

A shaft 116 is provided that is rotatably supported in bearings 108 and 108', and a first end 118 thereof is threaded and shouldered, on which a longitudinal flat surface (not shown) is formed. A centrally disposed opening 120 is formed in cutter Q (FIG. 13) which is of such shape as to permit the cutter to slidably and snugly engage end 118, but when the cutter is mounted thereon, it is not rotatable relative thereto. A nut 122 engages the threaded end 118 and removably supports the cutter Q thereon.

A first pulley 124 located in space 110 is rigidly secured to shaft 116. A second pulley 126 is rigidly secured to the end of shaft 116 opposite that on which the cutter Q is mounted. A recess 128 is formed in each section 112 and 112' which extends forwardly from each rear face thereof. The head F includes a vertical plate 130, best shown in FIG. 3, in which a transverse bore 132 is formed.

A cylindrical body 134 is provided that is of such transverse cross section as to snugly and slidably fit within either of the recesses 128. An eccentrically located stud bolt 136 projects rearwardly from body 134. A body shoulder 138 is defined at the junction of body 134 and bolt 136, and a nut 140 is in engagement with bolt 136. When nut 140 is tightened, shoulder 138 is forced into frictional contact with plate 130 and will not rotate relative thereto.

A transverse guide strip 142 is situated under the vertical plate 130 and projects forwardly therefrom, and this strip is secured to the plate by bolts 144, or other conventional fastening means. The forwardly projecting strip 142 is slidably engaged by the flat under surface 146 of one of the sections 112 and 112' when the section is caused to engage the cylindrical body 134, as illustrated in FIG. 3. The recesses, together with the forwardly extending portion of the guide strip 142, cooperatively serve to hold the cutting assembly G in either the first position shown in FIG. 1 when it is desired to edge the left-hand side of the device A, or in the second position (FIG. 2) when it is desired to edge on the right-hand side thereof.

In the event the recesses 128 become out-of-round due to wear, the cylindrical body 134 can be adjusted to snugly but slidably engage the out-of-round recess by first loosening the nut 140, slightly rotating the body 134 to make such engagement possible, and then tightening the nut 140 again to hold the body in the new position.

The cutting assembly G is held in either the first or second positions shown in FIGS. 1 and 2 and is operated by proper tensioning of the belt J. By means of the lever 58 previously described, the power unit H may be shifted longitudinally on the platform D to loosen the belt J to permit changing of the cutting assembly G to either the first or second position. Thereafter, by pulling rearwardly on the lever 58 and tightening of the handle 68, the power unit H may be so positioned on the platform as to exert a desired tension of the belt J.

The cutting assembly G may also be supported in a third position (not shown) by causing a recess 128 in section 112 to engage the cylindrical body 134. The third position of the cutting assembly G is the same as that shown in FIG. 2, with the exception that the cutter Q is more closely positioned relative to the head F, and the belt J engages pulley 124. Positioning of the cutting assembly G in the third position is particularly advantageous when the carrier wheel C and wheels 12 and 14 roll along the upper surface of a curb (not shown) to edge a lawn adjacent the interior vertical face of the curb.

Also, the cutting assembly G may occupy a fourth position, as shown in FIG. 15, wherein the cutter Q is horizontally positioned, and the belt J engages the pulley 126. In the fourth position the pin 134 engages a recess 128 formed in section 112. When the cutting assembly G is in the fourth position, it is prevented from pivoting on the cylindrical body 134 for a flat surface of section 112 is in abutting contact with strip 142. When the cutting assembly G is in the fourth position, it may be selectively disposed either forwardly of the carriage B or to the left or right thereof as illustrated in FIG. 10. Movement of cutter Q to any one of the three positions mentioned above is made possible by use of the pin 72.

When the spring-loaded pin 72 (FIG. 11) is drawn upwardly it is disengaged from one of the openings 24 to permit the platform D, arm E and head F to be swung relative to the carriage B in a desired position such as shown in phantom line in FIG. 9. After the platform D has been so pivoted relative to carriage B, the upward force exerted on pin 72 is released whereby the spring 148 associated therewith moves the pin downwardly into one of the openings 24 to maintain the platform in the selected position.

An alternate form of cutting assembly G' is shown in FIG. 12 that is utilized with the device A for trimming weeds growing along a walk curb, or the like, to a desired height. Assembly G' includes a cylindrical bearing from which two vertically spaced horizontal legs 150 and 152 extend rearwardly to abut against and are rigidly secured to a vertical rectangular member 154, which abuts against the forward face of the head F.

A recess (not shown) is formed in member 154 that slidably engages the cylindrical body 134 with the lower surface of member 154 resting on the forward portion of the guide strip 142. Bearing 148 rotatably supports a shaft 156, the upper end of which a pulley 158 is secured that is driven by the endless belt J.

The lower end of bearing 148 develops into a flange 160 from which bolts 162 project downwardly therethrough to support a guard 164 for the cutter Q as shown in FIG. 12. The cutter Q is secured to the lower end of shaft 156 in the same manner as it was secured to shaft 116 previously described.

Cutter blade Q (FIG. 13) is preferably formed from steel plate in the form of a cross that includes a center portion 170 from which four legs 172 extend radially. Each leg 172 has two oppositely disposed first and second side surfaces 172a and 172b, and two first and second side edges 172c and 172d, respectively, as shown in FIG. 13. First side surface 172a and first side edge 172c define a first cutting edge 172e at the junction thereof. Second side surface 172b and second cutting edge 172d define a second cutting edge 172f at their junction. Opening 120 is located in center portion 170, as shown in FIG. 13. From the above description of cutter blade Q it will be seen that the cutting edges 172e and 172f are so positioned thereon as to permit reverse direction operation of the blade.

Operation of the edging and trimming device A is relatively simple. When the device A is being moved across a hard surface R, the handle K and rod O are positioned as illustrated in FIG. 4. After the invention has been moved onto a lawn surface to be edged, the handle 102 is manipulated to permit the rod O and legs L to be positioned as shown in FIG. 5 wherein the wheels 10 and carrier wheel C cooperatively so support the carriage B that the cutter Q is disposed to edge the lawn to a desired depth.

When the device A is positioned as shown in FIG. 5, the user is only required to push the device along a selected path to accomplish uniform edging of a lawn, without the necessity of watchful attention to the position of the cutter Q during the edging operation. During the edging of a lawn in this manner, the wheels 12 and 14 may be caused to move longitudinally along a curb, with the wheel 10 serving to stabilize the position of the device A during travel thereof.

Tightening or loosening of the belt J is achieved by use of the lever 58 as previously described. The cutter Q may be placed in any one of the four positions previously mentioned by simply removing the cutting assembly G from head F and re-mounting the cutting assembly in the selected position on the head.

When it is desired to trim weeds or a tough turf adjacent a walk curb, or the like, the cutter assembly G is removed from the head F and replaced by the cutter assembly G', as shown in FIG. 12. Assembly G' is adapted to be pivoted either to the right or left of the device A (FIG. 9), or positioned directly in front thereof as illustrated in FIG. 12.

In FIG. 1 it will be noted that a transverse bore 166 is formed in pulley 124 that may be removably engaged by a pin 168 having a head 170. The pin 168 removably supported in a bore formed in the upper portion of head F, as also shown in FIG. 1. When it is desired to remove nut 122 from shaft 118, the pin is projected through bore 166. When force is applied to nut 122 to unscrew the same from shaft 118, the shaft is held stationary after it has rotated to the extent that the pin is in contact with sections 112 and 112'. The pin 168 also serves to hold shaft 118 stationary when nut 122 is being screwed thereon. After nut 122 has been removed from or mounted on shaft 118, the pin 168 is removed from bore 166 and returned to the position shown in FIG. 1.

I claim:
1. In a lawn edging and trimming device comprising carriage structure including a carrier wheel journaled to the forward portion thereof, a platform pivoted to swing laterally on said carriage and having a forwarding extending supporting arm to swing freely over said carrier wheel, a head on the forward portion of said arm, a drive unit mounted on said platform, a cutting unit mounted on said head, power transmitting means extending between said cutting unit and drive unit, a handle extending upwardly and rearwardly from said carriage, the improvement for operating said device to trim to a desired uniform height and edge to a desired uniform depth, comprising:
  (a) two laterally spaced legs pivotally supported at first ends thereof from the rear portion of said carriage;
  (b) a transverse shaft supported from second ends of said arms;
  (c) a plurality of laterally spaced wheels rotatably supported from said shaft;
  (d) a manually operated clamp means mounted on said handle; and
  (e) a rod pivotally connected on a first end thereof to said shaft, which rod extends upwardly through said clamp means and is longitudinally movable relative thereto, with said device being pivotally movable on said carrier wheel to dispose said cutting unit at a desired elevation relative to a surface on which said carrier wheel rests, which clamp means when in a clamping position frictionally grips said rod to prevent movement thereof relative to said clamping means, with said gripped rod selectively holding said arms, shaft, and wheels at a fixed position relative to said carriage, where when said carriage is moved over a surface on said carrier wheel and wheels, said cutting unit is held at a desired elevation relative to said surface.

2. A device as defined in claim 1 wherein first, second and third wheels are rotatably supported on said shaft, with said first and second wheels being so spaced as to roll along the upper surface of a curb to permit edging of a lawn adjacent said curb.

3. A device as defined in claim 2 wherein said third wheel is spaced sufficiently from said first and second wheels as to rest on lawn adjacent said curb, and cooperate with said carrier wheel and said first and second wheels to hold said device in a stable position as said device is moved longitudinally along said curb.

4. A device as defined in claim 1 wherein said handle is defined by two spaced elongate members that extend upwardly and rearwardly from said carriage and said clamping means includes:
  (f) a body disposed between said members, which body includes two parallel laterally spaced flanges projecting outwardly therefrom, and in which flanges transversely aligned openings are formed;
  (g) means for supporting said body in a fixed position on said members;
  (h) a cylindrical body slidably supported in said openings, with said body having a transverse bore formed therein that slidably engages said rod, which body includes an axially aligned threaded extension projecting therefrom;
  (i) a washer encircling said cylindrical body and disposed between said rod and a first one of said flanges; and
  (j) a handle provided with a tapped recess that engages said threaded extension, with a portion of said handle bearing against said first flange, which handle when rotated draws said cylindrical body towards it to permit said rod to be frictionally engaged by said washer to the extent that said rod is held in a fixed longitudinal position relative to said body.

5. A device as defined in claim 1 wherein said cutting unit has a forwardly extending recess of circular transverse cross section formed therein, and a transverse bore is formed in said head, which device further includes:
  (f) a cylindrical body that snugly and slidably engages said recess;
  (g) a stud bolt extending rearwardly from said body and eccentrically positioned relative to the longitudinal axis thereof, with said bolt projecting rearwardly through said bore; and
  (h) a nut that engages said bolt and bears against said head, which nut when loosened permits said cylindrical body to be rotated and adjusted to snugly engage said recess after said recess has become out-of-round from wear.

6. A device as defined in claim 1 which further includes
  (f) means for holding the rotatable portion of said cutting unit stationary when work is being performed on said unit.

7. A device as defined in claim 6 wherein said means comprises an elongate rigid member that can be extended through a bore in said rotatable portion of said member abutting against a part of said cutting unit when said movable portion attempts to rotate.

References Cited

UNITED STATES PATENTS

| | | | |
|---|---|---|---|
| 2,632,990 | 3/1953 | Stricklen et al. | 56—25.4 |
| 2,791,875 | 5/1957 | Faas | 56—25.4 |
| 2,855,742 | 10/1958 | Cooper et al. | 56—25.4 |
| 3,090,186 | 5/1963 | Dykes et al. | 56—25.4 |

RUSSELL R. KINSEY, Primary Examiner

U.S. Cl. X.R.

56—256; 172—15